United States Patent
Huss et al.

(10) Patent No.: US 6,545,946 B1
(45) Date of Patent: Apr. 8, 2003

(54) METHOD AND APPARATUS FOR ELIMINATING SUBSTANTIALLY FALSE ECHOES PRODUCED BY ELECTRICAL NOISE INDUCED INTO HIGH GAIN RECEIVER CIRCUITS

(75) Inventors: Charles George Huss, Shakopee, MN (US); Eric David Haugen, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/075,725

(22) Filed: Feb. 14, 2002

(51) Int. Cl.7 .............................................. G01S 15/12
(52) U.S. Cl. ........................ 367/99; 367/87; 367/908; 367/135
(58) Field of Search ........................ 367/99, 100, 101, 367/102, 135, 908, 87; 73/290

(56) References Cited

U.S. PATENT DOCUMENTS 5,508,974 A * 4/1996 Meyer et al. ................ 367/99
5,587,969 A * 12/1996 Kroemer et al. ............. 367/99
6,046,960 A * 4/2000 Kumar ........................ 367/87

* cited by examiner

Primary Examiner—Ian J. Lobo
(74) Attorney, Agent, or Firm—James M. Rashid; Calfee, Halter & Griswold LLP

(57) ABSTRACT

For use with a high gain receiver circuit which receives echo pulses of frequencies within a predetermined bandwidth and at times within interpulse periods of a predetermined pulse repetition rate and amplifies the echo pulses for measurement purposes, the receiver circuit susceptible to electrical noise within the frequency bandwidth of the received echo pulses to create false echo pulses, a method of eliminating substantially the false echo pulses without affecting substantially the amplified echo pulses by accepting only echo pulses which occur synchronously among interpulse periods. The pulse repetition rate may be varied to eliminate false echo pulses that are synchronous to the interpulse periods.

20 Claims, 4 Drawing Sheets

METHOD AND APPARATUS FOR ELIMINATING SUBSTANTIALLY FALSE ECHOES PRODUCED BY ELECTRICAL NOISE INDUCED INTO HIGH GAIN RECEIVER CIRCUITS

BACKGROUND OF THE INVENTION

The present invention relates generally to the elimination of false echoes produced by electrical noise, and more particularly to a method and apparatus for eliminating substantially false echoes produced by electrical noise induced into high gain receiver circuits.

High gain receiver circuits are used in many applications for the decoding of received echo signals. One such application by way of example is use of an ultrasonic signal for ranging or gauging. In such systems, an ultrasonic transducer is caused to transmit an ultrasonic signal towards a target area by a transmitter circuit and receive reflections or echoes from the target which are provided to a receiver circuit for the decoding thereof. The distance between the transducer and target may be determined by multiplying the round trip time between transmission of the ultrasonic signal and reception of its echo signal with the velocity of sound based on the medium through which the ultrasonic signal is traveling. The ultrasonic signal is generally a tone pulse, the tone of which being selected at a resonant frequency which may be easily discriminated from energy echoes received by the transducer from other sources, such as mechanical vibration or shock, for example. The tone pulses are also transmitted at a pulse repetition rate having an interpulse period based on the distance to be measured, i.e. the maximum round trip time of the tone pulse should fall well within the interpulse period.

Typical transducers include circuits for converting electrical signals to ultrasonic signals and vice versa. Generally, the electrical signals representative of the echoes received by the transducer are at low levels. Consequently, these electrical echo signals are amplified with a high gain amplifier which is generally included in the receiver circuit which becomes a high gain receiver circuit. These high gain amplifiers are susceptible to electrical noise from electromagnetic and other noise sources, including the transmitter. While the high gain receiver circuits generally include filter circuits to filter out induced electrical noise at frequencies removed from the ultrasonic resonant frequency, the filter circuits can not eliminate electrical noise within the bandwidth of the resonant frequency without decreasing or affecting the level of the echo signal being decoded by the receiver. Accordingly, undesirable noise interference which coincides with the resonant frequency bandwidth of an echo signal may be mistakenly decoded by the receiver as an echo signal or signals (false echoes) which will cause erroneous measurements to be taken. To compound matters, such electrical noise may be both synchronous and asynchronous with the pulse repetition rate of the received pulses.

The present invention which will be described in detail herein below overcomes the drawbacks of the current high gain receiver circuits and provides for the substantial elimination of false echoes produced by induced electrical noise which falls within the bandwidth of the resonant frequency of the received pulses to improve the resultant ranging measurements using the echo pulses, whether or not such electrical noise is synchronous or asynchronous to the pulse repetition rate of the received pulses.

SUMMARY OF THE INVENTION

In accordance with one aspect of the present invention, an ultrasonic ranging system comprises: an ultrasonic transducer; transmitter circuitry coupled to the transducer for causing the transducer to generate tone pulses of frequencies within a predetermined bandwidth and at a predetermined pulse repetition rate to a target area, the transducer for receiving echo tone pulses from the target area at times within interpulse periods of the predetermined pulse repetition rate and converting the received echo tone pulses into representative electrical echo pulses; receiver circuitry coupled to the transducer for receiving the electrical echo pulses from the transducer, the receiver circuitry susceptible to electrical noise within the frequency bandwidth of the electrical echo pulses to create false echo pulses; and a filter for eliminating substantially the false echo pulses by accepting only electrical echo pulses which occur synchronously among interpulse periods, wherein the accepted echo pulses are used for range measurements of the target area.

In accordance with another aspect of the present invention, a method of measuring range to a target area using ultrasonic pulsing comprises the steps of: generating ultrasonic tone pulses of frequencies within a predetermined bandwidth and at a predetermined pulse repetition rate to a target area; receiving the ultrasonic tone pulses from the target area at times within interpulse periods of the predetermined pulse repetition rate and converting the received echo tone pulses into representative electrical echo pulses; receiving the electrical echo pulses by receiver circuitry susceptible to electrical noise within the frequency bandwidth of the electrical echo pulses to create false echo pulses; eliminating substantially the false echo pulses by accepting only electrical echo pulses which occur synchronously among interpulse periods; and using the accepted echo pulses for range measurements of the target area.

In accordance with a further aspect of the present invention for use with a high gain receiver circuit which receives echo pulses of frequencies within a predetermined bandwidth and at times within interpulse periods of a predetermined pulse repetition rate and amplifies the echo pulses for measurement purposes, the receiver circuit susceptible to electrical noise within the frequency bandwidth of the received echo pulses to create false echo pulses, a method of eliminating substantially the false echo pulses without affecting substantially the amplified echo pulses comprises the step of eliminating substantially the false echo pulses by accepting only echo pulses which occur synchronously among interpulse periods.

DETAILED DESCRIPTION OF THE INVENTION

Figure 1:
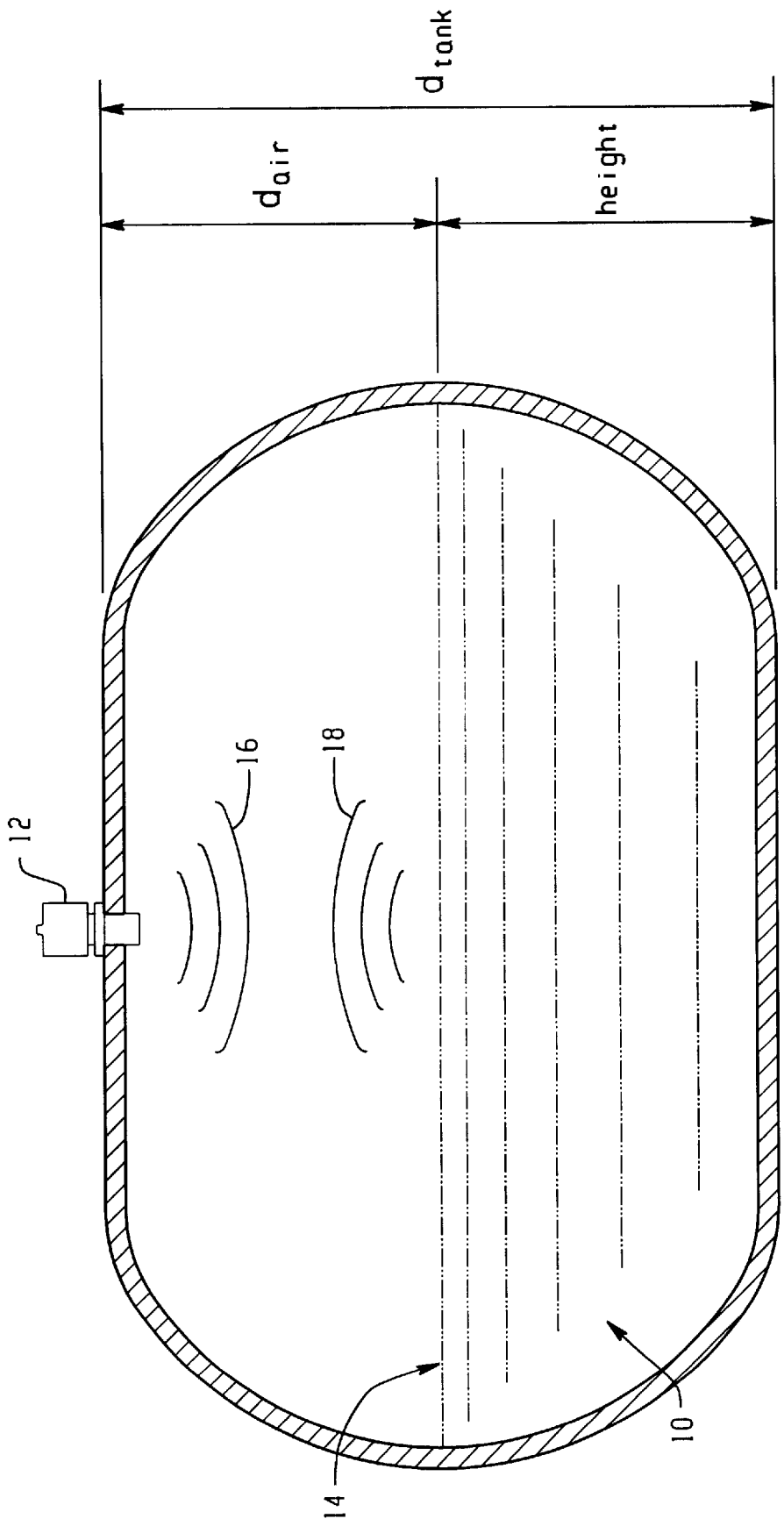
FIG. 1 is an illustration of an exemplary ultrasonic ranging system suitable for embodying the princies of the present invention.

An exemplary ultrasonic ranging system suitable for embodying the principles of the present invention is depicted in the illustration of FIG. 1. More specifically, FIG. 1 illustrates a liquid level sensing system using ultrasonic pulsing. Referring to FIG. 1, a container 10 contains a liquid, like water, for example, at a level or height. In the present embodiment, a conventional ultrasonic transducer 12 is disposed at the top of the container 10 and is caused to generate tone or acoustic pulses 16 of frequencies within a predetermined bandwidth and at a predetermined pulse repetition rate. The generated pulses 16 are directed towards a surface 14 of the liquid, referred to as the target area, and are reflected by the surface 14 as echo tone pulses 18 back to the transducer 12 where they are received and converted to electrical echo pulses representative of the echo tone pulses.

As will become more evident from the description herein below, measuring the time of flight of the tone pulse ($T_p$) for an interpulse period of the pulse repetition rate will provide a parameter from which to measure liquid level or height in the container 10. Since the transducer 12 is disposed on top of the container 10 in the present embodiment, the tone pulses 16 and their echoes 18 will travel through air or an air mixture above the liquid height. Thus, the speed of sound through the air or air mixture ($V_s$) may be known or determined. The distance of travel of the tone pulse through the air between the transducer 12 and liquid surface 14 may be calculated from the two parameters $V_s$ and $T_p$ using the following equation (1):

$$d_{air} = (V_s \times T_p)/2.$$

Also, since the distance ($d_{tank}$) between the transducer 12 and the bottom of the tank or container 10 is predetermined from the positioning of the transducer 12, the height of the liquid in the container 10 may be calculated from the following equation (2):

$$\text{height} = d_{tank} - d_{air}.$$

Since the speed of sound varies as a function of temperature, the present embodiment may include a temperature sensor to measure the temperature of the air above the liquid for use in compensating the speed of sound for changes in temperature of the medium through which the tone pulses travel. With knowledge of the geometry of the container 10, the quantity of liquid in the container may be calculated from the measured height.

While the exemplary system of FIG. 1 utilizes a ultrasonic transducer disposed on top of the tank or container 10, it is understood that the transducer may be disposed at other positions at the tank, like at the bottom, for example, just as well. The calculations may be modified to accommodate any change in transducer positioning at the container 10. Also, while a liquid level gauging system is used in the instant application as an embodiment of an ultrasonic ranging system, it is understood that any ranging system using ultrasonic pulsing may be used to embody the principles of present invention as will become more evident from the description in the following paragraphs.

Figure 2:
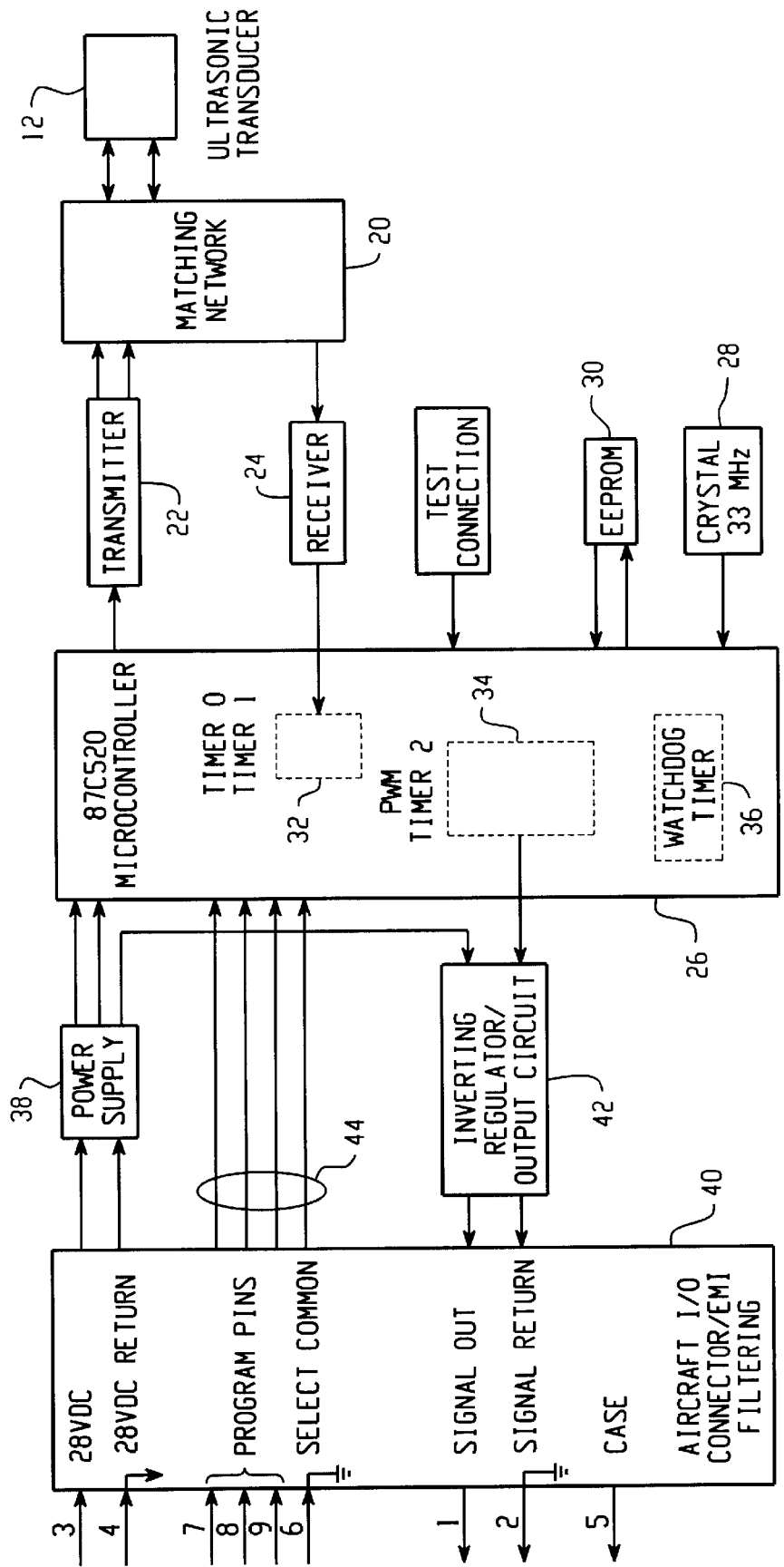
FIG. 2 is a block diagram schematic embodiment of an exemplary ultrasonic ranging system suitable for a variety of applications including the embodiment depicted in the illustration of FIG. 1.

FIG. 2 is a block diagram schematic of an exemplary ultrasonic ranging system suitable for a variety of applications including the application depicted in the illustration of FIG. 1 described herein above. Referring to FIG. 2, the ultrasonic transducer 12 is coupled through a matching network 20 to a transmitter circuit 22 and a receiver circuit 24. The matching network 20 is a directional coupler to channel transmit energy from the transmitter 22 to the transducer 12 and received echoes from the transducer 12 to the receiver 24. In the present embodiment, the circuits 22 and 24 are coupled to a programmed processor 26, which may be a microcontroller of the type manufactured by Dallas Semiconductor, bearing model number 87C520, for example. The timing of the processor 26 is governed by a crystal oscillator 28 which may be set to a precise frequency, like 33 MHz, for example. Operating instructions and data for the processor 26 may be stored in a memory 30, which may be a EEPROM, for example, that is also coupled to the processor 26. The processor 26 may include internal timers TIMER0 and TIMER1 shown at 32 and PWM TIMER shown at 34. A watchdog timer 36 may also be internal to the processor 26. The timing of the internal timers may be governed by the oscillator 28.

Moreover, the processor 26 and other circuitry of the embodiment of FIG. 2 may be powered by an external 28 VDC supply through an input/output (I/O) connector interface 40 which may include EMI filtering, a power diode for reverse polarity protection and transient suppression devices for power transient protection. The 28 VDC supply is coupled via interface 40 to a power supply circuit 38 comprising conventional linear voltage regulators for producing a +5 and +15 VDC regulated supplies used for powering the processor 26 and circuits coupled thereto. An inverting regulatory output circuit 42 is coupled between the output of the processor 26 and interface 40 and powered by the regulator 38. Special programming signals 44 may be coupled to data inputs of the processor 26 via interface 40 to program the processor 26 for the particular configuration of the ultrasonic ranging application. For example, if the system is for liquid level gauging, then the programming signals may program the processor as to the size of the container and/or the particular geometry or configuration thereof.

The foregoing described electronic circuits in connection with the embodiment of FIG. 2 may be integrated within a common housing with the transducer 12 at the container 10 or may be located separate from the transducer 12 without deviating from the broad principles of the present invention.

In operation, the processor 26 through program execution controls the transmitter circuit 22 to cause the transducer 12 to generate tone pulses 16 of frequencies within a predetermined bandwidth and at a predetermined pulse repetition rate to a target area. In the present embodiment, the transducer 12 is caused to generate a one microsecond (1 $\mu$s) tone burst or pulse every eight milliseconds (8 ms) yielding a pulse repetition rate of 125 pulses per second. At a nominal speed of sound in air of 1087 feet per second, an interpulse period of 8 ms provides for measurement of distances up to fifty-two inches. The system may include a temperature sensor (not shown) to measure temperature of the air inside the container 10 through which the tone pulse travels to compensate the nominal speed of sound for temperature changes. The transducer 12 receives the echo tone pulses 18 from the target area 14 at times within the interpulse periods of the pulse repetition rate and converts the received echo pulses into representative electrical echo pulses which are conducted to the receiver circuit 24 via matching network 20.

The receiver circuit 24 includes a high gain amplifier circuit (not shown) for amplifying the received electrical echo pulses from the transducer 12, thus rendering it a high gain receiver. This high gain receiver 24 is susceptible to electrical noise induced therein from electromagnetic and other noise sources, including the transmitter 22. The high gain receiver circuit 24 further includes filter circuits (not shown) to filter out induced electrical noise at frequencies removed from the ultrasonic resonant frequency. However, the filter circuits can not eliminate electrical noise within the bandwidth of the resonant frequency without decreasing or affecting the level of the echo signal being decoded by the receiver. Accordingly, undesirable noise interference which has a frequency spectrum that coincides with the resonant frequency bandwidth of an echo signal is amplified and decoded along with the received echo pulses from the transducer 12 by the receiver circuit 24 rendering both real echo signals and false echo signals which are conducted along to the processor 26 for use in determining range measurements to the target area. If left unattended, the false echo pulses will cause erroneous range measurements. To compound matters, such electrical noise may be both synchronous and asynchronous with the pulse repetition rate of the generated pulses.

Figure 3:
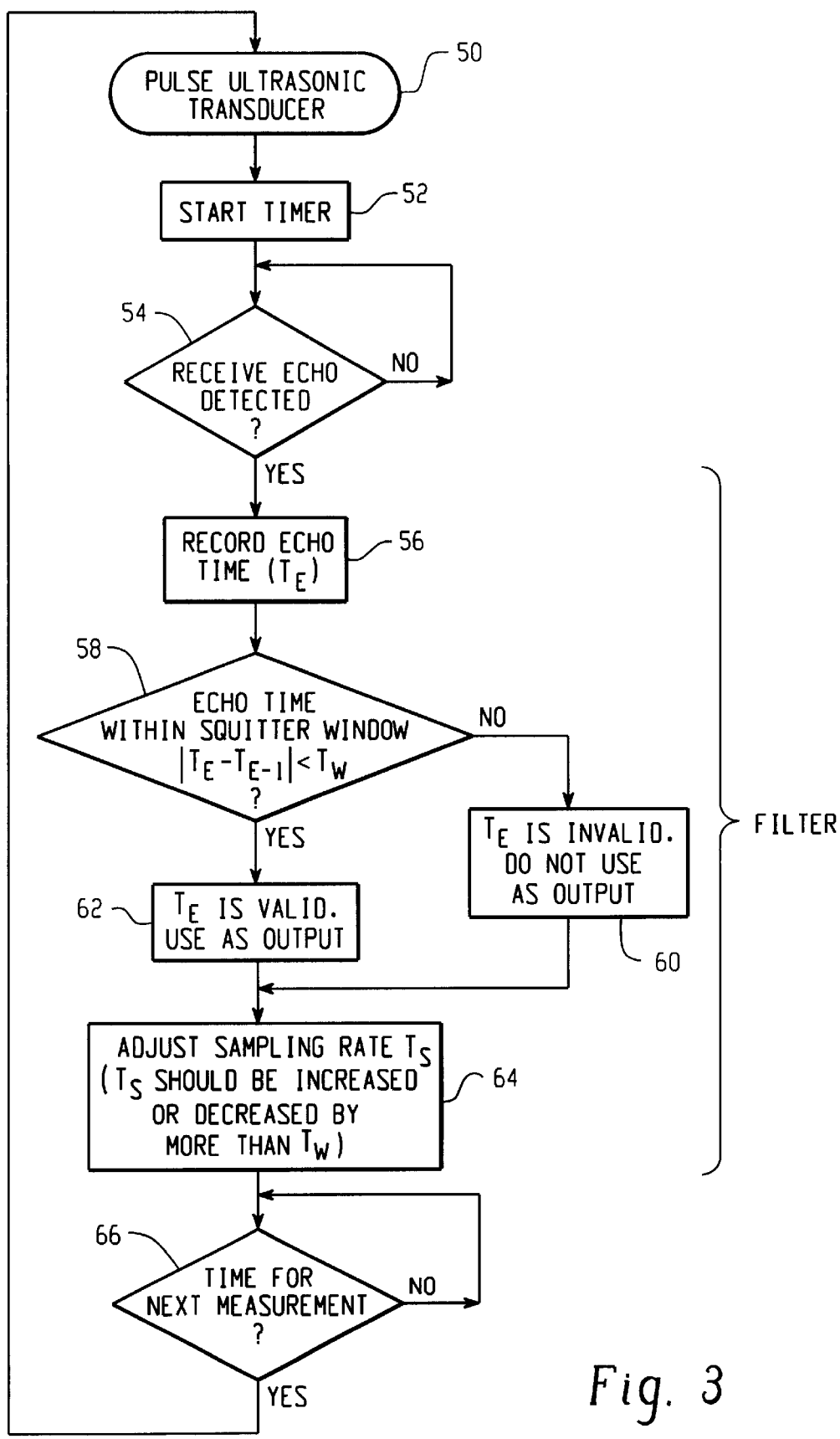
FIG. 3 is a flowchart depicting exemplary program execution in the processor of the embodiment of FIG. 2.

The flowchart of FIG. 3 depicts an exemplary program execution in the processor 26 during an interpulse period for determining the level of liquid in the container 10. Starting at step 50, the program controls the transmitter 22 to cause the transducer 12 to generate a tone pulse towards the target area 14 which is the initiation of the interpulse period. Concurrently, step 52 enables an internal timer of the processor 26, like TIMER1, for example, to commence counting from zero based on the crystal oscillator clock 28. When an echo pulse is received from the high gain receiver circuit 24 as determined by the decisional step 54, the concurrent count in TIMER1 is recorded by step 56 as time of flight data $T_E$, i.e. stored in a designated memory location of the processor 26.

The subsequent steps 58, 60, 62, and 64 of the flowchart represent a filter program in accordance with the present invention for eliminating substantially false echo pulses by accepting only echo pulses which occur synchronously among interpulse periods, wherein the accepted pulses are used for range measurements of the target area by the processor 26. To accomplish this task, decisional step 58 determines if the current received pulse having a recorded echo time $T_E$ occurs in the instant interpulse period within a predetermined time window or squitter window about the time an electrical echo pulse occurred, i.e. having an echo time $T_{E-1}$, in a preceding interpulse period. The echo time $T_{E-1}$ would have been determined by steps 50–56 of the program for the preceding interpulse period and stored in a designated memory location.

Figure 4:
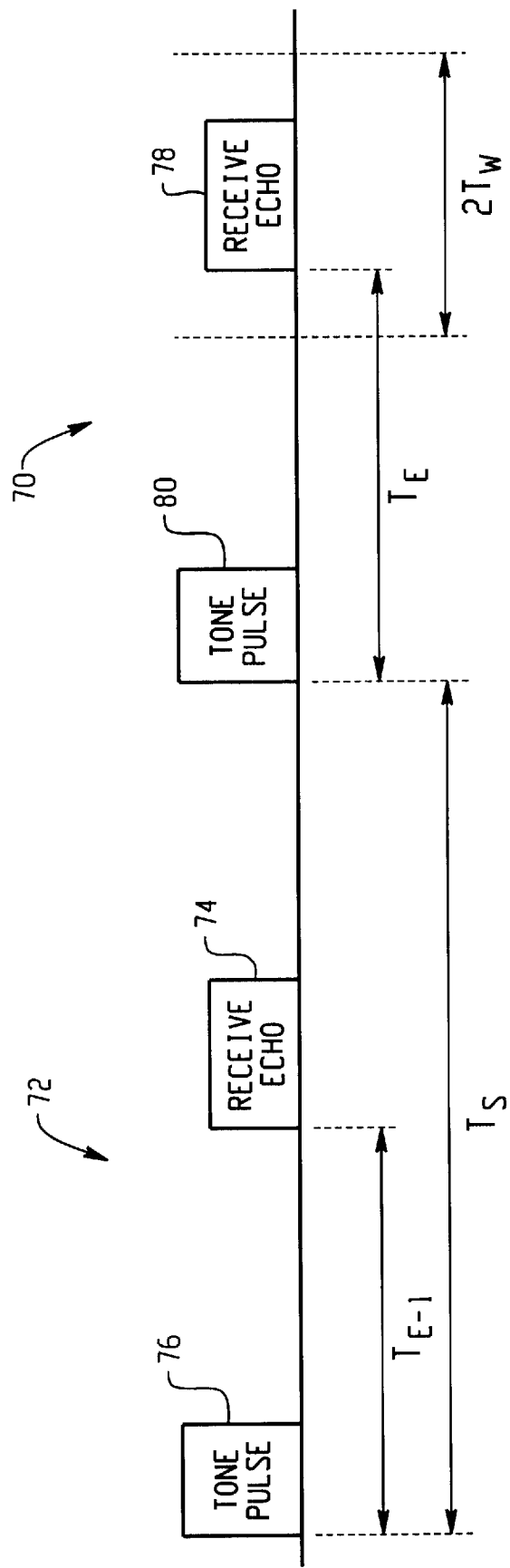
FIG. 4 is a time graph illustrating tone and echo pulses in accordance with the embodiments of FIGS. 2 and 3.

As illustrated in the time graph of FIG. 4, in the present embodiment, the times of occurrence of the received pulses from the instant interpulse period 70 and preceding interpulse period 72, $T_E$ and $T_{E-1}$, respectively, are measured with respect to the time of generation of the tone pulse of the respective interpulse period. Accordingly, the time of occurrence $T_{E-1}$ of the received echo pulse 74 in the preceding period 72 is measured from the time of generation of its respective tone pulse 76 and the time of occurrence $T_E$ of the received echo pulse 78 in the instant period 70 is measured from the time of generation of its respective tone pulse 80. So, in order to determine if the echo time of the current echo pulse is within the squitter window, denoted as $2T_W$, step 58 calculates the absolute difference between the echo times $T_E$ and $T_{E-1}$ and compares it to the time $T_W$. If the absolute difference is greater than time $T_W$, the current echo pulse is considered invalid and not synchronous, and thus is not accepted for use in range measurements by step 60. Otherwise, if the absolute difference is less than time $T_W$, the current pulse is considered synchronous and valid, thus accepted for use in range measurements by step 62. After steps 60 or 62, the pulse repetition rate may be varied in step 64. This is accomplished in the present embodiment by adjusting the sampling or interpulse period, denoted as $T_S$, to a new value, preferably increased or decreased by more than $T_W$.

In the present embodiment, a digital value $T_S$ representing the time of the interpulse period may be preset into an internal timer of the processor 26, like TIMER0, for example, which may be counted down to zero commencing with the generation of the tone pulse by step 50. Accordingly, step 64 determines from time to time a new time value for $T_S$ to be preset into counter TIMER0. Thereafter, in step 66, the program waits for the counter TIMER0 to count down to zero, then presets it with the same or new value, and the process is repeated for the next interpulse period starting again at step 50. Thus, based on the foregoing described filter program, asynchronous electrical noise induced false pulses are eliminated substantially by rejecting pulses that are not synchronous or consecutively similar in time among interpulse periods and synchorous electrical noise induced false pulses are eliminated substantially by varying the pulse repetition rate of the generated tone pulses and applying a window filter synchronized to the generated tone pulses.

Once a pulse echo time is accepted, it is processed by the processor 26 for calculating the range measurement as described herein above. Utilizing the internal timer of the processor 26 based on the oscillator clock 28 of the present embodiment, the time of flight or occurrence can be accurately measured, resulting in an accuracy of liquid level or range accuracy of +/−0.3 inches (8 mm). Each range measurement calculated may become part of accumulated raw data which may be run through a decimating Finite Impulse Response (FIR) digital filter for providing a smoothed output range measurement signal with a step response time of less than one second, for example. A digital range measurement signal is provided from the processor 26 to the output circuit 42 which may include a circuit for converting the digital signal into a proportional analog current signal within the range of 4–20 milliamps (mA) which is conducted out through the interface 40. If the dimensions of the container are preprogrammed into the processor 26, then the processor 26 may determine the quantity of liquid in the container from the liquid level measurement. In this case, the digital output signal and converted proportional analog current signal would be representative of the liquid quantity in the container.

While the present invention has been described herein above in connection with one or more embodiments, it is understood that this description is provided merely be way of example and should not limit the present invention in any way, shape or form. Rather, the present invention should be construed in breadth and broad scope in accordance with the recitation of the claims appended hereto.

What is claimed is:

1. An ultrasonic ranging system comprising:

an ultrasonic transducer;

transmitter circuitry coupled to said transducer for causing the transducer to generate tone pulses of frequencies within a predetermined bandwidth and at a predetermined pulse repetition rate to a target area, said transducer for receiving echo tone pulses from said target area at times within interpulse periods of said predetermined pulse repetition rate and converting said received echo tone pulses into representative electrical echo pulses;

receiver circuitry coupled to said transducer for receiving said electrical echo pulses from the transducer, said receiver circuitry susceptible to electrical noise within the frequency bandwidth of the electrical echo pulses to create false echo pulses; and a filter for eliminating substantially said false echo pulses by accepting only electrical echo pulses which occur synchronously among interpulse periods, wherein the accepted echo pulses are used for range measurements of said target area.

2. The system of claim 1 including means for varying the pulse repetition rate.

3. The system of claim 1 wherein the filter includes means for determining the synchronized echo pulse as an electrical echo pulse which occurs in an instant interpulse period within a predetermined time window about the time an electrical echo pulse occurred in a preceding interpulse period.

4. The system of claim 3 wherein the filter includes means for measuring times of occurrence of echo pulses in an interpulse period with respect to the time of generation of the tone pulse corresponding to the interpulse period.

5. The system of claim 4 wherein the filter includes means for varying the pulse repetition rate of the generated tone pulses.

6. The system of claim 1 including a programmed processor coupled to the receiver circuitry; and wherein the filter comprises a filter program executable by said programmed processor to determine the echo pulses received from the receiver circuit that are synchronized among interpulse periods.

7. The system of claim 6 wherein the programmed processor is coupled to the transmitter circuitry for controlling the pulse repetition rate of the tone pulses caused to be generated by the transducer.

8. The system of claim 7 wherein the filter program is executable by said programmed processor to determine the times of occurrence of the electrical echo pulses in an instant interpulse period with respect to the time of generation of the tone pulse corresponding to the interpulse period.

9. The system of claim 8 wherein the filter program is executable by said programmed processor to determine the synchronized echo pulse as an electrical echo pulse which occurs in the instant interpulse period within a predetermined time window about the time an electrical echo pulse occurred in a preceding interpulse period.

10. The system of claim 9 wherein the filter program is executable by said programmed processor to vary the pulse repetition rate of the generated tone pulses.

11. A method of measuring range to a target area using ultrasonic pulsing, said method comprising the steps of:

generating ultrasonic tone pulses of frequencies within a predetermined bandwidth and at a predetermined pulse repetition rate to a target area;

receiving said ultrasonic tone pulses from said target area at times within interpulse periods of said predetermined pulse repetition rate and converting said received echo tone pulses into representative electrical echo pulses;

receiving said electrical echo pulses by receiver circuitry susceptible to electrical noise within the frequency bandwidth of the electrical echo pulses to create false echo pulses;

eliminating substantially said false echo pulses by accepting only electrical echo pulses which occur synchronously among interpulse periods; and using said accepted echo pulses for range measurements of said target area.

12. The method of claim 11 including the step of varying the pulse repetition rate.

13. The method of claim 11 wherein the step of eliminating includes the step of determining the synchronized echo pulse as an electrical echo pulse which occurs in an instant interpulse period within a predetermined time window about the time an electrical echo pulse occurred in a preceding interpulse period.

14. The method of claim 13 including the step of measuring times of occurrence of echo pulses in an interpulse period with respect to the time of generation of the tone pulse corresponding to the interpulse period.

15. The method of claim 14 wherein the step of eliminating includes the step of varying the pulse repetition rate of the generated tone pulses.

16. For use with a high gain receiver circuit which receives echo pulses of frequencies within a predetermined bandwidth and at times within interpulse periods of a predetermined pulse repetition rate and amplifies said echo pulses for measurement purposes, said receiver circuit susceptible to electrical noise within the frequency bandwidth of said received echo pulses to create false echo pulses, a method of eliminating substantially said false echo pulses without affecting substantially the amplified echo pulses, said method comprising the step of eliminating substantially said false echo pulses by accepting only echo pulses which occur synchronously among interpulse periods.

17. The method of claim 16 including the step of varying the pulse repetition rate.

18. The method of claim 16 wherein the step of eliminating includes the step of determining the synchronized echo pulse as an echo pulse which occurs in an instant interpulse period within a predetermined time window about the time an echo pulse occurred in a preceding interpulse period.

19. The method of claim 18 including the step of measuring times of occurrence of echo pulses in an interpulse period with respect to a fixed time corresponding to the interpulse period.

20. The method of claim 19 wherein the step of eliminating includes the step of varying the pulse repetition rate.

* * * * *